May 2, 1967

H. ELSÄSSER 3,317,735

PHOTOELECTRIC SCANNING ARRANGEMENT INCLUDING
A ROTATING CYLINDRICAL LENS

Filed June 27, 1963

Inventor
Heinrich Elsässer
by Michael S. Striker
Attorney

3,317,735
PHOTOELECTRIC SCANNING ARRANGEMENT INCLUDING A ROTATING CYLINDRICAL LENS

Heinrich Elsässer, Stuttgart-Vaihingen, Germany, assignor to Franz Morat G.m.b.H., Stuttgart-Vaihingen, Germany
Filed June 27, 1963, Ser. No. 290,977
Claims priority, application Germany, June 29, 1962, M 53,391
18 Claims. (Cl. 250—219)

The present invention relates to a scanning arrangement, and more particularly to a photoelectric scanning arrangement for scanning a flexible element, such as a film or tape, by light rays.

It is known to scan a tape or film having markings thereon by light rays passing therethrough, and being received by photoelectric cells which are energized depending upon the presence or absence of a marking in the scanned section of the moving band, such as a tape or film. Conventional constructions use a lens system including a lens element having a cylindrical surface for producing a convergent beam of light which is concentrated on a narrow section of the moving band.

According to the known art, the band is guided between stationary guide means, and also slides on a gate having a narrow slot defining the scanned area. Due to the sliding contact, the band is worn, and dust and heat develops which soils the lenses by which the light is concentrated on the scanned section of the band. Furthermore, if films with photographic markings or recordings thereon are used, the surface of the film is scratched, and the markings gradually destroyed.

According to other known constructions, the band is guided only along the edges thereof by a pair of turnable flanges connected by a thin shaft, and the scanning beam of light passes between the flanges to the slot of the stationary gate. This arrangement has the disadvantage, that the edge portions of the scanned band cannot be used for markings or recordings.

It is one object of the invention to overcome the disadvantages of the prior art, and to provide a scanning device eliminating any frictional engagement between the scanned band and a stationary part.

A related object of the invention is to provide an arrangement for illuminating consecutive sections of a moving band in which scratching of the surface of the band is prevented.

Another object of the invention is to support a moving band on a rotary lens element of the illuminating lens system so that the band and the surface of the rotary lens element move at the same speed.

Another object of the present invention is a scanning arrangement in which light rays emitted by a source of light are focussed by a cylindrical lens elements rotating about its cylinder axis.

Another object of the invention is to provide a scanning arrangement of simple construction in which a lens element of the illuminating lens system is used for guiding the scanned portion of a tape or film having markings or recordings which are to be scanned by a beam of light.

With these objects in view, one embodiment of the invention comprises a lens system including a lens element having an outer peripheral cylindrical surface and being supported for rotation about the axis of the cylindrical surface; an elongated flexible element, such as a film with photographic markings or recordings, or a tape with perforations or markings of different light permeability, guided for movement about a portion of the cylindrical surface and abutting the same in coupling engagement; and drive means for driving either the flexible element, or the cylindrical lens element, or both so that the cylindrical surface and the flexible element move at the same speed.

The cylindrical lens element is designed to focus light rays emitted by a source of light on a narrow area. Since the cylindrical surface of the lens element remains in the same position, even during movement of the lens element, the shape of the beam of light is not varied during rotation of the lens element, and consecutive narrow sections of the film or tape are illuminated during operation, without any relative movement between the tape or film and the cylindrical surface of the rotating lens element. In this manner scratching of the surface of the film or tape is reliably prevented.

When only the band element, such as the film or tape, is driven, which may be accomplished by a sprocket engaging a row of perforations in the film or tape, the cylindrical lens element will be rotated due to the frictional engagement between the band element and the cylindrical surface. Conversely, if only the cylindrical lens element is rotated by drive means, the band element would be taken along at the speed of the cylindrical surface due to the frictional coupling engagement between the cylindrical lens element and the band element.

In the preferred embodiment of the invention, a sprocket is fixedly secured to the lens element and engages a row of perforations in the band element. The cylindrical lens element and the sprocket fixed thereto are rotated by drive means, and due to the engagement between the sprocket and the perforations of the band element, any unintended slippage between the band element and the cylindrical surface of the lens element is completely prevented, and the band element and the cylindrical surface of the lens element move at the same speed. The axial length of the cylindrical lens element is the same as the available width of the band element, so that the entire area thereof, except for the row of perforations, can be utilized for markings or recordings which are to be scanned.

A plurality of photoelectric cells is illuminated according to the scanned and illuminated markings of the band element, and control, if energized, electric operating means. A series of photoelectric cells are arranged in axial direction of the cylindrical lens element and are energized in accordance with the position of a marking in the narrow axial section of the film or tape illuminated and scanned by the convergent beam of light passing through the cylindrical lens element. Since the beam of light diverges after passing through the scanned film, a plurality of series of photoelectric elements can be arranged along circular rows in the divergent beam.

The contact between the scanned band element and the rotating lens element has the additional advantage that heat produced by the focussed beam of light in the band element is conveyed away from the band element since the respective section of the cylindrical surface turns to a position located diametrically spaced from the band element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
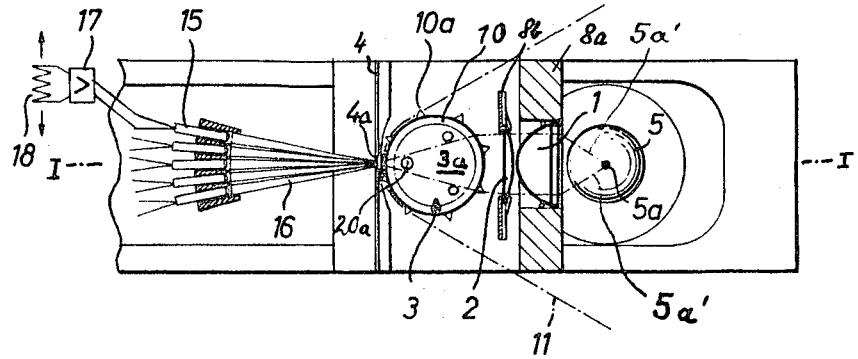
FIG. 2 is a plan view of the embodiment of FIG. 1.

Referring now to the drawing, a source of light, shown to be a lamp 5 with a coiled filament 5a is mounted on a suitable socket 5b on a supporting plate 8. An optical lens system including a condenser 1, a part cylindrical lens 2, and a lens element 3 is disposed to receive light rays 5a' emitted from the filament 5a The divergent light rays are deflected by the lenses 1 and 2 to be parallel, and then focussed by the cylindrical lens element 3 to converge on a narrow area of the cylindrical surface of lens element 3, as best seen in FIG. 2. Condenser lens 1 is mounted on a frame element 8a, and lens 2 is mounted on a frame element 8b, both of which are supported on the supporting plate 8 by brackets, not shown.

A bushing 7 is secured to supporting plate 8, and houses a ball bearing means including two ball bearings 9a and 9b which support a shaft 6 for rotation about its axis. A flange on the upper end of shaft 6 and a pair of nuts 6b on a threaded portion of shaft 6 prevent axial movement of shaft 6 relative to the bearing and the supporting means 7, 8.

A pair of screws 13a and 13b secures the hub of a large gear 13 to the free end of shaft 6. A drive shaft 14, driven by a motor, not shown, carries a pinion 12 which meshes with gear 13 so that shaft 6 is rotated in bearings 9a, 9b.

The upper end of shaft 6 carries a fixed flange 6a with a circular recess in which the cylindrical end portion 3b of lens element 3 is located. The bottom face of lens element 3 has three bores engaged by three screws 6' which pass through flange 6a into the threaded bores of lens element 3 so that the same is secured to shaft 6 for rotation therewith. The other end portion 3a of lens element 3 is also cylindrical, and is capped by a cap 19 which is secured by three screws 20 engaging threaded bores in the cylindrical end portion 3a of lens element 3. A flange of cap 19 presses a ring-shaped sprocket 10 against the central part 3c of lens element 3 so that sprocket 10 is secured to the lens element 3 for rotation therewith. The sprocket has outwardly projecting teeth 10a which engage a row of perforations along one lateral edge of a flexible band element 11, such as a tape or film carrying markings or recordings adapted to influence the passage of light through the band element. The central portion 3c of lens element 3 has an optically precise cylindrical outer surface whose center coincides with the axis of rotation of shaft 6 so that during rotation of shaft 6, the light rays are gathered by the lens element 3c to fall on a narrow section of the flexible band element 11, irrespective of whether the lens element 3 is at a standstill, or rotates. FIG. 2 illustrates lens element 3 with the cap 19 and screws 20 removed, so that the bores 20a, and the teeth 10a, of the sprocket 10 are clearly visible.

The optical lens system 1, 2, 3c is designed so that the image of the filament 5a is focussed on a narrow section of the band element 11. A gate 4 has a narrow axially extending slot 4a in the region of the narrow illuminated section of the band element 11. However, the gate 4 may be omitted if the optical system, and particularly the lens element 3, are designed so that the light rays are focussed on a narrow axially extending rectangular area of the cylindrical surface of lens portion 3c.

Figure 1:
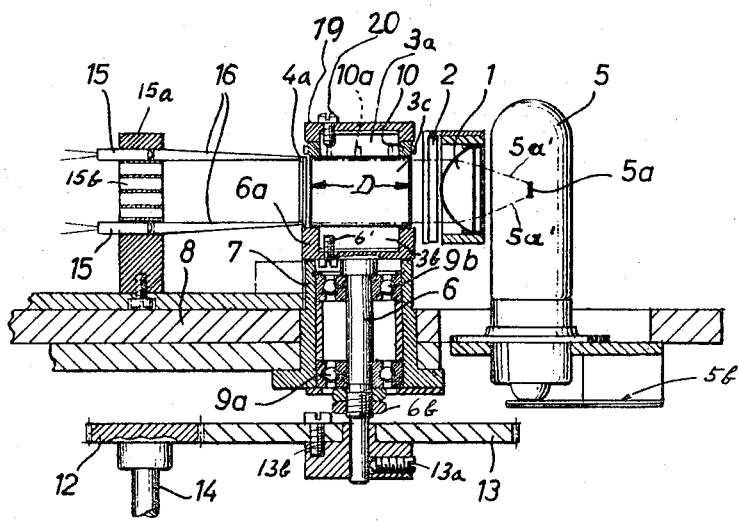
FIG. 1 is a side elevation, partly in section along line I—I in FIG. 2.

It will be understood that the rays 5a', which converge within the lens element 3, diverge again after passing through the band element 11 and the slot 4a, and in accordance with a preferred embodiment of the invention a plurality of light-guiding means 16 of known structure and optical properties, are provided for guiding the divergent rays to a series of photoelectric cells 15 which are arranged along a circular line having its center in the region of the illuminated band section. Rows of photoelectric cells extend in axial direction of lens element 3a, so that, for example, in the illustrated embodiment thirty photoelectric cells 15 may be mounted on the support 15a which has suitable supporting passages for the photoelectric cells 15. FIGS. 1 and 2 illustrate only ten photoelectric cells, but evidently it is possible to provide five photoelectric cells in each of the six tiers of supporting passages 15b so that thirty photo cells are positioned to receive light.

In a simplified embodiment of the invention, only a single axially extending row of six photo cells 15 is provided, and each of the photo cells is selectively illuminated by light passing through the narrow illuminated section of band element 11 in accordance with the position of markings or perforations on the band element.

Each of the photoelectric cells 15 is connected to an amplifier 17 which controls an electric operating means 18, such as an electro-magnetic means, which is adapted to perform an operation when receiving a command signal from the respective photoelectric cell 15 in accordance with a marking or recording on the program tape or film 11.

In the event that lens element 3 has a sufficiently great index of refraction, lens 2 may be omitted. When glass having an index of refraction of about 2 is used for lens element 3, the focus of the lens system is located on the cylindrical surface of lens portion 3c. However, this glass type is softer than glass having an index of refraction of 1.5, and it is also more expensive, so that it is preferred to use for lens element 3 glass having an index of refraction of approximately 1.5, and to provide the additional lens 2 which has a part-cylindrical, and a planar surface.

When drive shaft 14 drives shaft 6 with lens element 3 through gears 12, 13, lens element 3 rotates together with sprocket 10 which transports the flexible band element 11 at a speed equal to the speed of the cylindrical surface of the central lens portion 3c, so that no relative displacement between the band element 11 and the cylindrical surface of the lens element 3 takes place. Therefore, the surface of the band element cannot be scratched, or worn off by sliding frictional engagement. However, it is possible to omit the sprocket, and to transport the band only by rolling friction between lens element 3 and band element 11. In such a construction, relative movements between the band element and the rotating lens element will not take place, even if the band shrinks or stretches. Such a shrinkage or stretching of the band element would result in a displacement of perforations engaged by sprocket 10 so that it is advantageous to provide sufficient surface contact between the rotating lens element and the band element 11 to assure transportation of the band element even if an edge of a perforation is not properly engaged by a tooth 10a of the sprocket 10. In a modified arrangement, the band may be driven by sprockets, and no drive means connected to the lens element 3 so that the same is rotated at the speed of the moving band by a rolling frictional engagement.

It will be understood that each of the elements described above, or two or more together, may also find a useful application in other types of scanning arrangements differing from the types described above.

While the invention has been illustrated and described as embodied in a photoelectric scanning and illuminating arrangement comprising a rotary cylindrical lens whose surface moves at the same speed as a scanned flexible band, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement comprising, in combination, a lens system including a lens element having an outer peripheral cylindrical surface; means supporting said lens element for rotation about the axis of said cylindrical surface; a source of radiant energy for emitting radiant energy rays toward said lens element; means for guiding an elongated flexible element for movement in longitudinal direction thereof about, and abutting in coupling engagement a part-cylindrical portion of said cylindrical surface; and drive means for driving at least one of said elements so that said cylindrical surface and said flexible element move at the same speed whereby said rays passing through, and converged by said cylindrical surface of said lens element and illuminating a narrow section of said flexible element, impinge consecutive narrow sections of said flexible element during movement of the same without relative movement between said flexible element and said cylindrical surface of the rotating lens element.

2. An arrangement as set forth in claim 1, wherein said lens element has an index of refraction in the range between 1.5 and 2.0.

3. An illuminating arrangement comprising, in combination, a source of light; a lens system including a lens element having an outer peripheral cylindrical surface, said lens system being disposed relative to said source of light so that light rays passing transversely through said lens element converge on a narrow area of said cylindrical surface remote from said source; means supporting said lens element for rotation about the axis of said cylindrical surface; means for guiding an elongated flexible element for movement in longitudinal direction thereof about a source of radiant energy for emitting radiant energy rays toward said lens element; portion of said cylindrical surface which includes said narrow area; and drive means for driving at least one of said elements so that said cylindrical surface and said flexible element move at the same speed whereby said rays passing through, and converged by said cylindrical surface of said lens element and illuminating a narrow section of said flexible element registering with said narrow area of said cylindrical surface, impinge consecutive narrow sections of said flexible element during movement of the same without relative movement between said flexible element and said cylindrical surface of the rotating lens element.

4. An arrangement comprising, in combination, a lens system including a lens element having an outer peripheral cylindrical surface; means supporting said lens element for rotation about the axis of said cylindrical surface; a source of radiant energy for emitting radiant energy rays toward said lens element; means for guiding an elongated flexible band element such as a film or tape for movement in longitudinal direction thereof about, and abutting in coupling engagement a part-cylindrical portion of said cylindrical surface; and drive means for driving at least one of said elements so that said cylindrical surface and said flexible element move at the same speed whereby said rays passing through, and converged by said cylindrical surface of said lens element and illuminating a narrow section of said flexible band element, impinge consecutive narrow sections of said flexible element during movement of the same without relative movement between said flexible band element and said cylindrical surface of the rotating lens element.

5. An illuminating arrangement comprising, in combination, a source of light; a lens system including a lens element having an outer peripheral cylindrical surface, said lens system being disposed relative to said source of light so that light rays passing transversely through said lens element converge on a narrow area of said cylindrical surface remote from said source; means supporting said lens element for rotation about the axis of said cylindrical surface; means for guiding an elongated flexible band element such as a film or tape for movement in longitudinal direction thereof about, and abutting in coupling engagement a part-cylindrical portion of said cylindrical surface which includes said narrow area; and drive means for driving at least one of said elements so that said cylindrical surface and said flexible element move at the same speed whereby said rays passing through, and converged by said cylindrical surface of said lens element and illuminating a narrow section of said flexible band element registering with said narrow area of said cylindrical surface, impinge consecutive narrow sections of said flexible band element during movement of the same without relative movement between said flexible band element and said cylindrical surface of the rotating lens element.

6. An arrangement comprising, in combination, a lens system including a lens element having an outer peripheral cylindrical surface; means supporting said lens element for rotation about the axis of said cylindrical surface; a source of radiant energy for emitting radiant energy rays toward said lens element; means for guiding an elongated flexible element for movement in longitudinal direction thereof about, and abutting in coupling engagement a part-cylindrical portion of said cylindrical surface, said flexible element having a row of perforations; and drive means for driving at least one of said elements and including a sprocket having teeth engaging said perforations so that said cylindrical surface and said flexible element move at the same speed whereby said rays passing through, and converged by said cylindrical surface of said lens element and illuminating a narrow section of said flexible element, impinge consecutive narrow sections of said flexible element during movement of the same without relative movement between said flexible element and said cylindrical surface of the rotating lens element.

7. An arrangement comprising, in combination, a lens system including a lens element having an outer peripheral cylindrical surface; means supporting said lens element for rotation about the axis of said cylindrical surface; a source of radiant energy for emitting radiant energy rays toward said lens element; means for guiding an elongated flexible element for movement in longitudinal direction thereof about, and abutting in coupling engagement a part-cylindrical portion of said cylindrical surface, said flexible element having a row of perforations; and drive means for driving at least one of said elements and including a sprocket having teeth engaging said perforations and being fixedly secured to said lens element for rotation therewith about said axis so that said cylindrical surface and said flexible element move at the same speed whereby said rays passing through, and converged by said cylindrical surface of said lens element and illuminating a narrow section of said flexible element, impinge consecutive narrow sections of said flexible element during movement of the same without relative movement between said flexible element and said cylindrical surface of the rotating lens element.

8. An arrangement comprising, in combination, a lens system including a lens element having an outer peripheral cylindrical surface; means supporting said lens element for rotation about the axis of said cylindrical surface; a source of radiant energy for emitting radiant energy rays toward said lens element; means for guiding an elongated flexible element for movement in longitudinal direction thereof about, and abutting in coupling engagement a part-cylindrical portion of said cylindrical surface, said flexible element having a row of perforations; and drive means for driving said elements, and including rotary drive member secured to said lens element coaxial with the same, and a sprocket secured to said lens element coaxial with the same and for rotation therewith, said sprocket having teeth engaging said perforations so that said cylindrical surface and said flexible element move at the same speed whereby said rays passing through, and converged by said cylindrical surface of said lens element and illuminating a narrow section of said flexible element, impinge consecutive narrow sections of said flexible element during movement of the same without relative movement between said flexible element and said cylindrical surface of the rotating lens element.

9. An illuminating arrangement comprising, in combination, a source of light; a lens system including a lens element having an outer peripheral cylindrical surface, said lens system being disposed relative to said source of light so that light rays passing transversely through said lens element converge on a narrow area of said cylindrical surface remote from said source; means supporting said lens element for rotation about the axis of said cylindrical surface; an elongated flexible element abutting on and being guided for movement in longitudinal direction thereof about, and abutting in coupling engagement a part-cylindrical portion of said cylindrical surface which includes said narrow area, said flexible element having a row of perforations, and including a rotary drive member secured to said lens element coaxial with the same, and a sprocket secured to said lens element coaxial with the same and for rotation therewith, said sprocket having teeth engaging said perforations so that said cylindrical surface and said flexible element move at the same speed whereby said rays passing through, and converged by said cylindrical surface of said lens element and illuminating a narrow section of said flexible element registering with said narrow area of said cylindrical surface, impinge consecutive narrow sections of said flexible element during movement of the same without relative movement between said flexible element and said cylindrical surface of the rotating lens element.

10. An illuminating arrangement as set forth in claim 9, wherein said lens system includes a condenser and a lens with one cylindrical surface between said source and said cylindrical element; and wherein said lens element is made of glass having an index of refraction of substantially 1.5.

11. A photoelectric scanning arrangement comprising, in combination, a source of light; a lens system including a lens element having an outer peripheral cylindrical surface, said lens system being disposed relative to said source of light so that light rays passing through said lens element converge on a narrow area on said cylindrical surface remote from said source; bearing means supporting said lens element for rotation about the axis of said cylindrical surface; a flexible light-permeable band element with markings thereon and having a portion abutting in coupling engagement a part-cylindrical portion of said cylindrical surface to move with the same and covering said narrow area of the same; rotary drive means for driving at least one of said elements so that said cylindrical surface and said band element move at the same speed whereby consecutive narrow sections of said band element and markings thereon are illuminated by said narrow area on said cylindrical surface during rotation of said lens element without relative movement between said band element and said cylindrical surface; at least one photoelectric cell located on the side of said band element remote from said lens element and being illuminated by rays scanning said narrow sections of said band element and markings thereon; and electric operating means connected to said photoelectric cells and being actuated when rays impinge said photoelectric cell.

12. An arrangement as set forth in claim 11, and including a series of photoelectric cells arranged in a row with said photoelectric cell, said low extending parallel to said axis of said cylindrical surface of said lens element, and electric operating means connected to each cell of said series.

13. An arrangement as set forth in claim 12, and including light-guiding means extending between said narrow section of said band element and each of said photoelectric cells.

14. An arrangement as set forth in claim 11, and including a series of photoelectric cells arranged with said cell along a circular line having its center in the region of said narrow section of said band element and being illuminated by rays diverging after passing through said narrow sections of said band element, and a plurality of electric operating means respectively connected with said cells of said series.

15. A photoelectric scanning arrangement comprising, in combination, a source of light; a lens system including a lens element having an outer peripheral cylindrical surface, said lens system being disposed relative to said source of light so that light rays passing through said lens element converge on a narrow area on said cylindrical surface remote from said source; bearing means supporting said lens element for rotation about the axis of said cylindrical surface; a flexible light-permeable band element with markings thereon and having a portion abutting in coupling engagement a part-cylindrical portion of said cylindrical surface to move with the same and covering said narrow area of the same, said band element having a marginal row of perforations; rotary drive means for driving at least one of said elements and including a sprocket having teeth engaging said perforations and being fixedly secured to said lens element coaxial with said cylindrical surface so that said cylindrical surface and said band element move at the same speed whereby consecutive narrow sections of said band element and markings thereon are illuminated by said narrow area on said cylindrical surface during rotation of said lens element without relative movement between said band element and said cylindrical surface; at least one photoelectric cell located on the side of said band element remote from said lens element and being illuminated by rays scanning said narrow sections of said band element and markings thereon; and electric operating means connected to said photoelectric cells and being actuated when rays impinge said photoelectric cell.

16. A photoelectric scanning arrangement comprising, in combination, a source of light; a lens system including a lens element having an outer peripheral cylindrical surface, said lens system being disposed relative to said source of light so that light rays passing through said lens element converge on a narrow area on said cylindrical surface remote from said source; bearing means supporting said lens element for rotation about the axis of said cylindrical surface; a flexible light-permeable band element having successive narrow sections with coded markings thereon and having a portion abutting in coupling engagement a part-cylindrical portion of said cylindrical surface to move with the same and covering said narrow area of the same; rotary drive means for driving at least one of said elements so that said cylindrical surface and said band element move at the same speed whereby consecutive narrow sections of said band element and markings thereon are illuminated and scanned by said narrow area on said cylindrical surface during rotation of said lens element without relative movement between said band element and said cylindrical surface; a plurality of photoelectric cells located on the side of said band element remote from said lens element and being illuminated by rays scanning said narrow sections of said band element and markings thereon; a gate having a narrow slot and disposed between said photoelectric cell and said band element adjacent the latter and with said slot registering with said area and sections; and electric operating means connected to said photoelectric cells and being actuated when rays impinge said photoelectric cells.

17. A photoelectric scanning arrangement comprising, in combination, a source of light having an incandescent coiled filament emitting light rays; a lens system including a lens elements having an outer peripheral cylindrical surface, said lens system being disposed relative to said source of light so that light rays passing through said lens element converge on a narrow area on said cylindrical surface remote from said source; bearing means supporting said lens element for rotation about the axis of said cylindrical surface; a flexible light-permeable band element having successive narrow sections with coded markings thereon and having a portion abutting in coupling engagement a part-cylindrical portion of said cylindrical surface to move with the same and covering said narrow area of the same, said band element having a marginal row of perforations; rotary drive means for driving at least one of said elements and including a sprocket having teeth engaging said perforations and being fixedly secured to said lens element coaxial with said cylindrical surface and a drive shaft coaxial with said lens element and sprocket and connected to the same for rotating the same so that said cylindrical surface and said band element move at the same speed whereby consecutive narrow sections of said band element and markings thereon are illuminated and scanned by said narrow area on said cylindrical surface during rotation of said lens element without relative movement between said band element and said cylindrical surface; a plurality of photoelectric cells located on the side of said band element remote from said lens element and being illuminated by rays diverging after scanning said narrow sections of said band element and markings thereon; a gate having a narrow slot and disposed between said photoelectric cell and said band element adjacent the latter and with said slot registering with said area and sections; and electric operating means connected to each of said photoelectric cells and being actuated when rays impinge said photoelectric cells.

18. An arrangement as set forth in claim 17, and including light guiding means extending between said narrow section of said band element and each of said photoelectric cells.

References Cited by the Examiner

UNITED STATES PATENTS

| | | | |
|---|---|---|---|
| 1,684,117 | 9/1928 | Smith et al. | 250—219 |
| 2,254,932 | 9/1941 | Bryce | 250—219 |
| 2,817,995 | 12/1957 | Kirkham | 352—117 |
| 2,972,280 | 2/1961 | Kudar | 352—116 |

RALPH G. NILSON, *Primary Examiner.*

WALTER STOLWEIN, *Examiner.*

M. A. LEAVITT, *Assistant Examiner.*